No. 819,267. PATENTED MAY 1, 1906.
W. W. DEAN.
TELEPHONE TRANSMITTER.
APPLICATION FILED OCT. 27, 1902.
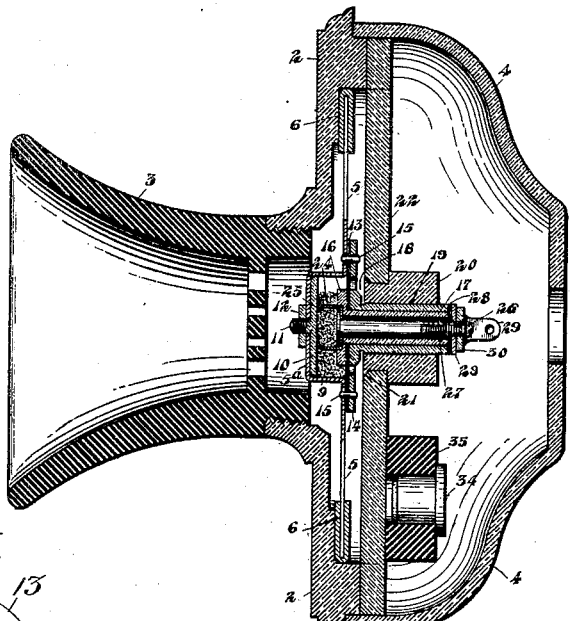
Fig. 1.
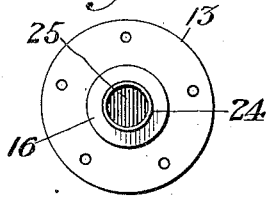
Fig. 5.
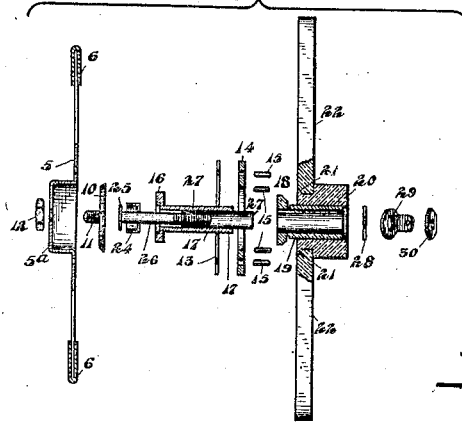
Fig. 2.
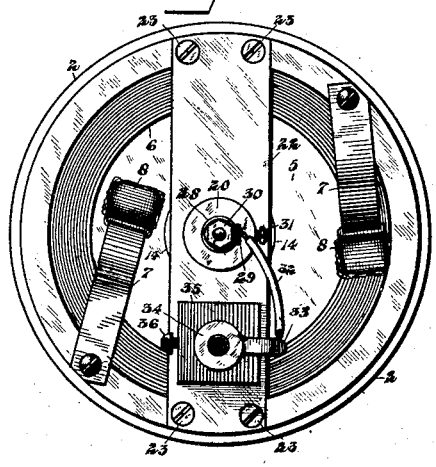
Fig. 3.
Fig. 4.
Witnesses.
R. H. Burfeind
Gazelle Beder
Inventor:—
William W. Dean.
by Robert Lewis Ames
Attorney.

UNITED STATES PATENT OFFICE.

WILLIAM W. DEAN, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS.

TELEPHONE-TRANSMITTER.

No. 819,267.  Specification of Letters Patent.  Patented May 1, 1906.

Application filed October 27, 1902. Serial No. 128,883.

*To all whom it may concern:*

Be it known that I, WILLIAM W. DEAN, a citizen of the United States, residing at Chicago, in the county of Cook and State of Illinois, have invented new and useful Improvements in Telephone-Transmitters, of which the following is a specification.

My invention relates to improvements in telephone-transmitters, my object being to provide a transmitter in which an extremely large variation of resistance without complication of parts is obtained.

Other objects are the construction of an instrument that is efficient, durable, and comparatively inexpensive to manufacture.

In the ordinary commercial transmitter the amount of variation of resistance therein is limited by its necessary features of construction—such, for instance, as the depth of the chamber for the carbon granules or other comminuted resistance-varying material, and likewise the inertia of the diaphragm and parts operated thereby. If the depth of the chamber is too great and an attempt is made to fully compress the granules between the opposed electrodes, the time element entering into the movement is too prolonged and the result is a muffling of the sound due to the speech-waves. The inertia of the diaphragm and the movable parts also prevent the necessary rapidity of vibration, if such prolonged movement thereof is required. It has been attempted to overcome these difficulties by providing the transmitter with a plurality of chambers in association with the diaphragm and by connecting said chambers and the diaphragm in series, whereby the amount of variation is multiplied as many times as there are chambers. This construction, however, is unsatisfactory and impractical. The multiplicity of chambers necessarily requires that each be small, whereby the heat generated by the passing current cannot be readily dissipated and injury to the transmission results. Again, in such devices there is no opportunity for the circulation of the granules between the chambers, and hence no convenient or satisfactory method of filling the same, it being almost an impossibility to procure uniform results in this respect in the manufacture of the device in large numbers.

My invention seeks to provide an instrument that will accomplish the results sought in a simple and effective manner, that will not become overheated in use, that will permit a free circulation of the granular material, that will allow a free vibration of the diaphragm, and in which the carbon button or chamber will be disposed in the most effective position with reference to the diaphragm and in which the chamber may be readily and expeditiously filled with the granular material and with the exact quantity desired for each transmitter, whereby uniform results in the manufacture of the instrument in large numbers is secured.

To the accomplishment of these objects and such others as may hereinafter appear, my invention comprises the parts and combinations of parts hereinafter described, and particularly pointed out in the appended claims, reference being had to the accompanying drawings, forming a part thereof, in which the same reference characters designate like parts throughout the several views, and in which—

Figure 1 is a sectional elevation of the device. Fig. 2 is a view of the parts separated. Fig. 3 is a rear view of the transmitter. Fig. 4 is a view of a modification; and Fig. 5 is a face view of the rear electrodes and the mica diaphragm.

The casing of the instrument comprises a metallic front plate 2, circular in form and having a central aperture in which is screwed the usual mouthpiece 3, and which plate is carried by and preferably secured to the metallic solid back or cup 4, the latter part being adapted to be secured to the free end of the usual transmitter-arm. A sound-receiving diaphragm $5_b$ consisting of a sheet-metal disk, preferably aluminium, is provided at its edges with a rubber band 6 and is pressed against a suitable ledge on the rear of the front plate 2 by means of the spring-fingers 7, which are provided with felt or rubber pads 8 upon their ends, one of the said springs bearing upon the diaphragm toward its center to dampen its vibration and the other bearing upon the band 6. The central portion $5^a$ of the diaphragm is deflected or displaced toward the front to form a chamber 9, in which the carbon granules or other comminuted material forming the resistance-varying medium is adapted to be carried While I show this chamber formed integrally with the sound-receiving diaphragm and while it is shown depressed out of the plane thereof, my invention contemplates in some of its aspects any method of forming or carrying said chamber. In the bottom of this depression a brass or other metallic disk 10 is located and is secured therein by a stud or stem 11, passing through an aperture in the bottom of said depression, and a nut 12 is threaded upon said projection outside the diaphragm. A mica disk 13, forming a supplemental diaphragm, is secured at its periphery at the edge of said chamber by means of the metallic ring 14 and a plurality of rivets 15. This disk or diaphragm serves to close said chamber to confine the granules therein. Other suitable material than mica may be employed, and other means for securing it to the edge of the chamber 9 may be employed.

The outer electrode 16 of the instrument, preferably of brass, is provided with a cylindrical shank 17, extending through a central aperture in said mica disk 13 and thence through the metallic clamping member 18 and its rearwardly-extending sleeve 19, the latter fitting closely over the shank 17 of the said electrode. The sleeve 19 extends through an aperture in a metallic block or support 20, which is secured in any desired way, preferably by upsetting its inner end at one or more points, as at 21, in a bridge-piece 22. This bridge is a metal bar secured at its ends in suitable notches in the back of the front piece 2 by means of suitable screws 23.

In the depression formed in the front face of the electrode 16 a cup 24, of insulating material, preferably paraffin paper, is located and is secured in place by means of a brass or other metallic disk 25, fitting closely within the cup and having a stem 26 passing rearwardly through an aperture in the bottom of said cup and thence through an insulating-sleeve 27, placed within the bore of the shank 17 of said electrode 16. This disk 25 constitutes the inner electrode of the instrument. A mica or other insulating-washer 28 is placed over said stem 26 and in the rear of said shank 17 and the sleeve 19. The washer portion of a terminal clip 29 is placed outside the insulating-washer 28, and a nut 30 is then threaded upon said stem 26, which upon being tightened serves to clamp the said electrodes together and to the mica disk. These electrodes and the mica disk are shown in face view in Fig. 5. The parts thus clamped together may be adjusted in position in the block 20 and secured therein by means of a suitable set-screw 31. This adjustment is readily accomplished by talking into the instrument before the set-screw 31 is tightened. The vibration of the diaphragm causes the shank 19 to assume the best normal position, when the screw 31 may be set up to secure the said shank rigidly. The two electrodes 16 and 25 are thus carried by the disk 13, the outer being of ring form and the inner of a simple disk form. These are preferably gold-plated, though it will be apparent that other contact-surfaces may be provided for the same. The granular material is placed in the chamber 9 between the said electrodes and the plate 10 and preferably fills the chamber, as shown, nearly on a line with the uppermost point of the outer electrode 16. The cup 24 does not touch the disk 10, and hence does not dampen its vibration. The edge of the cup should be at a distance from the face of the disk 10 a little greater than the thickness of the carbon granules. If the grains of carbon are .008 inch in diameter, the edge of the cup should be about .01 inch from the disk 10. This arrangement results in permitting the carbon in the chamber to circulate and to pass through the said space from one portion of the chamber to the other, whereby when it is desired to fill the chamber it is only necessary to roughly place therein a measured quantity of the granules and to close the chamber. As soon, then, as the instrument is used the carbon will find its proper location, and the instrument will be in working condition. Also if in the use of the instrument it is turned through an angle, so that the portion of the chamber before lowest is then highest, the carbon will immediately find its proper place.

The electric circuit of the instrument is from the casing 4, the plate 2, bridge 22, block 20, sleeves 19 and 17, outer electrode 16, the granular carbon in the outer portion of chamber 9, the disk 10, the carbon in the central portion of the chamber, the central electrode 25, stem 26, terminal washer 29, short conductor 32 to clip 33 of binding-post 34, carried in the insulating-block 35, suitably mounted upon and secured to the bridge 22. A circuit-conductor is inserted in the aperture in the post 34 and the set-screw 36 tightened to electrically and mechanically connect the same. The other side of the circuit is completed through the arm supporting the head 4, though a separate conductor could be employed, if desired. The insulating-cup 24 divides the material in chamber 9 into two portions, so that the current is practically confined thereto and which are in series in the current-path, whereby twice the variation in resistance is secured than if the current traversed the granules but once. This is secured, too, without dampening the action of the diaphragm and with the carbon at the most sensitive and most uniformly vibrated part of the diaphragm. The heat-dissipating power of the chamber is not decreased over that of the ordinary type, and the granules have free circulation with all its attending advantages.

The location of the chamber in the diaphragm causes a constant shaking of the carbon, which remains in a sensitive and loose condition. The forwardly-extending cup brings the active portion of the diaphragm closer to the speaker and at the same time utilizes the space in the transmitter otherwise wasted and permits the use of a straight bridge 22, thus reducing the cost of manufacture. The particular dimensions of the chambers, the carbon used, the separation of the edge of cup 24 from the plate 10, and other features of the device may obviously be departed from, though those shown and described are considered preferable. The inside of the cup is preferably covered with a coat of lacquer or varnish to insulate the carbon from the walls of the cup.

As shown in Fig. 4, the plate 10 may be wholly insulated from the diaphragm 5, as by the mica or other insulating-washers 37, placed upon the threaded pin 11 upon either side of the diaphragm, the opening through the latter being enlarged to prevent contact with the said pin 11. On account of the varnish or lacquer the periphery of plate 10 does not make electrical contact with the diaphragm.

While I have described one form of my invention, I do not wish in all respects to be confined thereto, as it is obvious that various changes and alterations may be made therein and still not depart from its scope and principle.

I claim—

1. In a telephone-transmitter, the combination with a sound-receiving diaphragm, of a single flat shallow chamber containing comminuted conducting material and in which the said material may pass from one part to another, a positive, negative and an intermediate electrode in said chamber, and means to divide the current-path through the material in said chamber into several parts, the arrangement of said electrodes being such as to cause the current to traverse said parts in series, substantially as described.

2. In a telephone transmitter, the combination with a sound-receiving diaphragm, of a single flat shallow chamber containing comminuted conducting material and in which the said material may pass from one part to another, electrodes in said chamber, and means to divide the current-path through the material in said chamber into several parts and to cause the current to traverse said parts in series, substantially as described.

3. In a telephone-transmitter, the combination with a sound-receiving diaphragm, of a single flat shallow chamber containing comminuted conducting material and in which the said material may pass from one part to another, electrodes in said chamber, and means to divide the current-path through the material in said chamber into two parts and to cause the current to traverse said parts in series, substantially as described.

4. In a telephone-transmitter, the combination with a sound-receiving diaphragm, of a single chamber containing comminuted conducting material in which said material may pass from one part to another, a plurality of electrodes on one side of the chamber, and means to cause the current to pass across said material a number of times in series between said electrodes, substantially as described.

5. In a telephone-transmitter, the combination with a sound-receiving diaphragm, of a chamber containing comminuted conducting material, a conducting member on one side of the chamber and two electrodes on the other, and means to cause the current to pass across the chamber between said electrodes and member in series while at the same time permitting the material to pass from one part of the chamber to another, substantially as described.

6. In a telephone-transmitter, the combination with a sound-receiving diaphragm, of a chamber containing comminuted conducting material, a conducting member on one side of the chamber actuated by the diaphragm, and a pair of electrodes on the other and opposite side of said chamber and forming the terminals of the electric circuit, said electrodes being insulated from each other and means to cause the current to pass from one electrode to the said plate and from the plate to the other electrode in series, the said material being permitted to circulate from one part to another of the chamber, substantially as described.

7. In a telephone-transmitter, the combination with a sound-receiving diaphragm, of a chamber containing comminuted conducting material, a conducting-plate on one side of said chamber, a pair of electrodes on the other, an insulating-partition projecting into the said chamber to divide it into two parts corresponding to said electrodes to cause the current to pass in series through the two parts of the chamber, said partition at the same time permitting the movement of the comminuted material from one part of the chamber to another, substantially as described.

8. In a telephone-transmitter, the combination with a sound-receiving diaphragm having a forwardly-deflected portion, of a chamber containing comminuted conducting material, a front conducting-plate located within said chamber and within the forwardly-deflected portion of the diaphragm, two electrodes opposing said plate and located upon the other side of the chamber, comminuted conducting material carried in said chamber between said plate and the electrodes, said electrodes being insulated from each other, an insulating-partition to cause the current to pass through different parts of said material between said electrodes in series, and a straight bridge located in the rear of the diaphragm to which said electrodes are rigidly secured, substantially as described.

9. In a telephone-transmitter, the combination with a sound-receiving diaphragm having a central forwardly-deflected portion, a chamber containing comminuted conducting material, a conducting-plate on one side of said chamber and located within said deflected portion, two electrodes on the other side of said chamber opposed to the conducting-plate, the outer electrode being of ring form and the inner electrode of disk form fitting within the inner periphery of the ring, said electrodes being insulated from each other, a forwardly-extending insulating-partition projecting nearly across the chamber, and a rigid support for said electrodes, substantially as described.

10. In a telephone-transmitter, the combination with a shallow chamber containing comminuted conducting material, of an electrode on one side of the chamber, a plurality of electrodes on the opposite side of the chamber, an insulating-partition between said latter electrodes projecting into the chamber toward the first-mentioned electrode but terminating short of the same, granular carbon in said chamber between said opposed electrodes, said material being adapted to pass from one part of the chamber to the other between said first electrode and the edge of said partition, substantially as described.

11. In a telephone-transmitter, the combination with a shallow chamber containing comminuted conducting material, of an electrode on one side of the chamber, a pair of electrodes on the other side of the chamber, one of said latter electrodes having a depression in its inner face, an insulating-cup adapted to fit within said depression with its edges projecting forwardly into the chamber and nearly across the same toward the opposite electrode, the other electrode of said pair fitting within said cup, whereby said electrodes are insulated from each other and the chamber is divided into two parts, substantially as described.

12. In a telephone-transmitter, the combination with a shallow chamber containing comminuted conducting material, of an electrode on one side of the chamber, a pair of electrodes on the opposite side of the chamber, one of said latter electrodes having a rearwardly-extending sleeve, an insulating-cup, the other of said pair of electrodes fitting within said cup and having a stem passing through said sleeve but insulated therefrom, the edges of said cup projecting forwardly into the chamber and toward the first-named electrode to form an insulating-partition in the chamber and said cup serving to insulate the two electrodes of the pair, said sleeve and stem forming the terminals of the electrodes and being secured together to clamp said pair of electrodes and the cup together, substantially as described.

13. In a telephone-transmitter, the combination with a shallow chamber containing comminuted conducting material, of an electrode on one side of the chamber, a pair of electrodes on the opposite side of the chamber, one of said latter electrodes having a sleeve extending from its outer face and a central depression in its inner face, an insulating-cup fitting within the said depression with its edges projecting forwardly into and across the chamber toward the first-named electrode, the second electrode of said pair fitting within said cup and having a stem extending rearwardly through said sleeve but insulated therefrom, means for clamping said stem and sleeve together whereby said pair of electrodes and the insulating-cup are firmly secured together, said sleeve and stem being adapted to form the electrical terminals for the said chamber, substantially as described.

14. In a telephone-transmitter, the combination with a main sound-receiving diaphragm, of a single chamber suitably associated therewith and containing a number of compartments, a small, supplemental flexible diaphragm for closing one side of said chamber, comminuted conducting material in said compartments, adapted to pass from one compartment to another, an electrode in each of said compartments, and means to cause the current to pass through said comminuted material in said compartments in series between said electrodes, substantially as described.

15. In a telephone-transmitter, the combination with a sound-receiving diaphragm, of a single chamber suitably associated therewith and containing two compartments, a supplemental diaphragm of insulating material adapted to close both compartments, and partaking of the movement of said first-mentioned diaphragm, comminuted conducting material in said compartments, an electrode in each of said compartments on the same side of said chamber, and means to cause the current to pass through the conducting material in said compartments in series between said electrodes, substantially as described.

16. In a telephone-transmitter, the combination with a main sound-receiving diaphragm, of a chamber containing comminuted conducting material, an insulating supplemental diaphragm for closing said chamber, two electrodes on the side of said chamber closed by said supplemental diaphragm and vibratory therewith, and means whereby the current from one electrode to the other must twice pass transversely across the chamber, substantially as described.

17. In a telephone-transmitter, the combination with a sound-receiving diaphragm, of a chamber containing comminuted conducting material, a suitable partition within said chamber projecting into said material, two electrodes for said chamber, one upon either side of said partition, a supplemental diaphragm associated with said electrodes and closing said chamber, and means whereby current in passing from one electrode to the other must cross the chamber in two directions, substantially as described.

18. In a telephone-transmitter, the combination with a sound-receiving diaphragm, of a chamber containing comminuted conducting material associated with said diaphragm, a supplemental diaphragm of insulating material constituting one wall of said chamber, a non-conducting partition in said chamber dividing the comminuted conducting material into a plurality of compartments, two electrodes in said chamber, and means for causing current to pass from one electrode to the other through the material of all compartments in series, substantially as described.

19. In a telephone-transmitter, the combination with a main diaphragm, of a chamber associated therewith, comminuted conducting material within said chamber, a flexible supplemental diaphragm of insulating material for closing one side of said chamber, a pair of electrodes on the side of said chamber closed by said supplemental diaphragm, and a suitable insulating partition separating said electrodes and projecting into said material, while permitting said material to pass from one side thereof to the other, the current being adapted to travel around said partition and through the comminuted material upon either side thereof in series, substantially as described.

20. In a telephone-transmitter, the combination with a main diaphragm, of a chamber associated therewith, comminuted conducting material within said chamber, a flexible supplemental diaphragm for closing one side of said chamber, a pair of electrodes on the side of said chamber closed by said supplemental diaphragm, an electrode upon the opposite side of said chamber, and a suitable insulating-partition separating said pair of electrodes and projecting into said material, while permitting said material to pass from one side thereof to the other, the current being adapted to travel around said partition and through the comminuted material upon either side thereof in series, substantially as described.

21. In a telephone-transmitter, the combination with a main sound-receiving diaphragm, of a chamber associated therewith, a rigid support for one side of said chamber, a flexible supplemental diaphragm of insulating material interposed between said support and said main diaphragm and constituting one wall of said chamber, comminuted conducting material within said chamber, a partition in said chamber suitably secured to one side thereof and projecting into said material, but stopping short of the opposite side of said chamber, and means to cause the current to traverse the parts of said material divided by said partition in series, substantially as described.

22. In a telephone-transmitter, the combination with a chamber containing comminuted conducting material, of a main sound-receiving diaphragm secured to one side of said chamber, a bridge or support to which the other side of said chamber is attached, a flexible supplemental diaphragm of insulating material disposed between said main diaphragm and said bridge and constituting one wall of said chamber, a pair of electrodes within said chamber mounted on said insulating-diaphragm, and a partition extending from one side of said chamber into said comminuted conducting material but stopping short of the opposite side thereof, whereby the current is obliged to traverse the divided portions of said comminuted conducting material in series, substantially as described.

Signed by me at Chicago, county of Cook, State of Illinois, this 23d day of October, 1902.

WILLIAM W. DEAN.

Witnesses:
ROBERT LEWIS AMES,
GAZELLE BEDER.